US007318511B2

(12) United States Patent
Grogg (10) Patent No.: US 7,318,511 B2
(45) Date of Patent: Jan. 15, 2008

(54) COUPLING DEVICE INDEPENDENT OF DIFFERENTIAL SPEED

(75) Inventor: John A. Grogg, LaOtta, IN (US)

(73) Assignee: Eaton Corporation, Cleveland, OH (US)

( * ) Notice: Subject to any disclaimer, the term of this patent is extended or adjusted under 35 U.S.C. 154(b) by 256 days.

(21) Appl. No.: 11/167,474

(22) Filed: Jun. 27, 2005

(65) Prior Publication Data

US 2006/0289268 A1    Dec. 28, 2006

(51) Int. Cl.
F16D 25/02 (2006.01)
F16H 48/22 (2006.01)

(52) U.S. Cl. .............................. 192/85 AA; 192/103 F; 475/88

(58) Field of Classification Search ............ 192/103 F; 475/86, 88
See application file for complete search history.

(56) References Cited

U.S. PATENT DOCUMENTS

| | | | |
|---|---|---|---|
| 4,679,463 A | 7/1987 | Ozaki et al. | |
| 5,189,930 A * | 3/1993 | Kameda | 74/650 |
| 5,310,388 A | 5/1994 | Okcuoglu et al. | |
| 5,964,126 A | 10/1999 | Okcuoglu | |
| 6,464,056 B1 | 10/2002 | Lowell et al. | |
| 7,063,198 B2 | 6/2006 | Fratta et al. | |
| 2001/0035323 A1* | 11/2001 | Porter | 192/35 |
| 2005/0194231 A1* | 9/2005 | Babin | 192/85 AA |

* cited by examiner

Primary Examiner—Richard M Lorence
(74) Attorney, Agent, or Firm—Bradley J. Diedrich; L. J. Kasper (57) ABSTRACT

A coupling device (11;111) including a rotatable housing (13,15;113) defining a clutch cavity and a clutch assembly (29;129) disposed therein. The housing defines an apply chamber (37;137) and a clutch apply member (39) disposed therein to bias the clutch assembly into engagement. A source of pressurized fluid for the clutch apply member comprises a pumping element (59,61;159,161) operable to pump pressurized fluid in response to rotation of a rotor (61;161). There is a stationary plenum assembly (51;153) defining a pumping chamber, and the pumping element is operably disposed within the pumping chamber, and a drive means (63;163) is operable to transmit rotational movement of the rotatable housing (13,15;113) to said rotor (61;161) of the pumping element, such that clutch engagement is not dependent upon coupling input-to-output speed differential.

9 Claims, 5 Drawing Sheets

COUPLING DEVICE INDEPENDENT OF DIFFERENTIAL SPEED

BACKGROUND OF THE DISCLOSURE

The present invention relates to coupling devices of the type used to transmit torque, for example, in a vehicle driveline, and more particularly, to such coupling devices of the type including a fluid pressure operated clutch assembly for controlling the transmission of torque through the coupling device.

As used herein, the term "coupling device" will be understood to mean and include a device which is able to transmit torque from an input to one or more outputs, and in which there is a clutch assembly disposed in the "torque path" between the input and the output, such that the amount of torque transmitted is a function of the extent of engagement of the clutch assembly. Within the scope of the present invention, the term "coupling device" will further be understood to mean and include both gear-type devices (such as differentials), as well as gearless-type couplings.

Although the present invention may be utilized in conjunctions with many different types and configurations of gearless-type coupling devices, such as a coupling made in accordance with the teachings of U.S. Pat. No. 5,964,126, assigned to the assignee of the present invention and incorporated herein by reference, it is especially advantageous when utilized in conjunction with gear-type vehicle differentials of the general type illustrated and described in U.S. Pat. Nos. 5,310,388 and 6,464,056, both of which are also assigned to the assignee of the present invention and incorporated herein by reference. However, the coupling device of the present invention will differ from the devices of the above-incorporated patents in one important aspect, to be illustrated and described subsequently herein.

In the differential coupling devices of the above-incorporated patents, there is a clutch pack operable to transmit torque between the input (a housing connected to the ring gear) and the output (one of the axle shafts), with the degree of engagement of the clutch pack being determined by the fluid pressure in a clutch apply chamber. The fluid pressure biases a clutch apply (or engagement) member (such as a piston) against the clutch pack. The differential coupling device of the cited patents includes a gerotor pump having one rotor fixed to rotate with the coupling device input, and the other rotor fixed to rotate with an output of the coupling device, such that the flow of pressurized fluid into the clutch apply chamber is generally proportional to the speed difference between the input and the output. As used herein, the term "clutch pack" will be understood to mean and include both a multiple friction disk type clutch pack, as well as any of the other well known types of clutch assemblies, such as cone clutches, in which the degree of engagement is generally proportional to the fluid pressure acting on the clutch piston or on an equivalent clutch-engagement device or structure.

In differential coupling devices of the type to which the present invention relates, it is typical to provide a fluid flow path from the clutch apply chamber to a reservoir or some other "source" of low pressure fluid, and to provide, as part of this "main" flow path, some sort of control valve which can control the flow from the clutch apply chamber to the low pressure source. In this manner it is possible to control the pressure in the clutch apply chamber, and therefore, control the "bias torque", i.e., the extent to which torque is transmitted from the input to the output. In the differential coupling devices of the above-incorporated patents, in which the pump assembly rotates at a speed representative of the speed difference between the input and the output of the coupling device, it will be understood by those skilled in the art that, not until a certain, predetermined speed differential (input "minus" output) occurs, will there be enough pressure build-up in the clutch apply chamber to generate the desired bias torque.

A commercial embodiment of a differential coupling device of the general type to which the present invention relates, but including the "conventional" pump arrangement is illustrated and described in co-pending application U.S. Ser. No. 10/964,134, Filed Oct. 13, 2004 in the names of Celso L. Fratta, Robert J. Kyle, Keith E. Morgensai, and Patrick J. McMillan, for a "Coupling Device And Improved Fluid Pressure System Therefore". It has been observed that in this commercially developed differential coupling device, a typical "time to engagement" is in the range of about 300 milliseconds, with a differential speed across the coupling device of approximately 150 rpm. Although such a response time may be more than satisfactory for many applications for such differential coupling devices, especially when the devices are merely performing conventional "slip limiting" functions, to achieve basic traction control, there are now many other potential applications in which such a response time is clearly not acceptable. For example, if the same, basic coupling device were being used as part of a stability control system, it is anticipated that the required response time (time to engagement) would need to be somewhere in the range of about 50 milliseconds.

It is known to provide a differential coupling device in a vehicle driveline, wherein the device includes a hydraulic pressure-operated clutch and apply arrangement, wherein the source of the hydraulic pressure used to apply the clutch was a pump disposed "remotely" relative to the differential coupling device, with the pump having "full-time" drive. For example, such an arrangement is known in which the pump is driven off the main driveline prop-shaft of the vehicle. Thus, there is a constant source of hydraulic energy available to actuate the clutch, but the typical, remote location results in some fairly awkward packaging and mounting arrangements.

BRIEF SUMMARY OF THE INVENTION

Accordingly, it is an object of the present invention to provide an improved coupling device having a substantially improved engagement capability, i.e., a substantially reduced period of time for the coupling device to transition from a disengaged condition to an engaged condition.

It is a more specific object of the present invention to provide such an improved coupling device which accomplishes the above-stated object, and in which the generation of fluid pressure in the clutch apply chamber is not dependent upon the existence of a speed difference between the input of the coupling device and its output.

It is a further object of the present invention to provide such an improved coupling device in which there is at least the potential for engaging the clutch assembly of the coupling device even while the vehicle is still stationary.

The above and other objects of the invention are accomplished by the provision of an improved coupling device including a rotatable housing defining a clutch cavity, and a clutch assembly disposed in the clutch cavity and including a first clutch member fixed to rotate with the housing, and a second clutch member fixed to rotate with an output. The housing defines an apply chamber, and a clutch apply member is disposed in the apply chamber and is operable to bias the first and second clutch members into torque transmitting relationship in response to the presence of pressurized fluid in the apply chamber. The coupling device includes a source of the pressurized fluid, and a control valve means is operable to vary the fluid pressure in the apply chamber in response to variations in an input. A stationary plenum assembly is operably associated with the rotatable housing and cooperates therewith to define a high pressure fluid passage disposed between the source of the pressurized fluid and the apply chamber.

The improved coupling device is characterized by the source of pressurized fluid comprising a pumping element including a rotor operable to pump pressurized fluid in response to rotation of the rotor. The stationary plenum assembly defines a pumping chamber, and the pumping element is operably disposed within the pumping chamber to pump pressurized fluid into the high pressure fluid passage. A drive means is operable to transmit rotational movement of the rotatable housing to the rotor of the pumping element.

In accordance with another aspect of the invention, there is provided an improved control system for a coupling device including a rotatable housing defining a clutch cavity, a clutch assembly disposed in the clutch cavity and including a first clutch member fixed to rotate with the housing and a second clutch member fixed to rotate with an output. The housing defines an apply chamber and a clutch apply member is disposed in the apply chamber and is operable to bias the first and second clutch members into torque transmitting relationship in response to the presence of pressurized fluid in the apply chamber. The coupling device includes a source of pressurized fluid, the source being operably associated with the rotatable housing and driven thereby, and control valve means is operable to vary the fluid pressure in the apply chamber in response to variations in an input. A stationary plenum assembly is operably associated with the rotatable housing and cooperates therewith to define a high pressure fluid passage disposed between the source of the pressurized fluid and the apply chamber.

The improved control system is characterized by the source of pressurized fluid cooperates with the plenum assembly to define a fluid outlet in communication with an inlet of the control valve means. The control system further comprises an accumulator having its port in fluid communication with the fluid outlet and with the inlet of the control valve means, whereby the control valve means is operable to communicate pressurized fluid from the accumulator to the apply chamber, in response to the input, in the absence of rotation of the rotatable housing.

DETAILED DESCRIPTION OF THE PREFERRED EMBODIMENT

Figure 1:
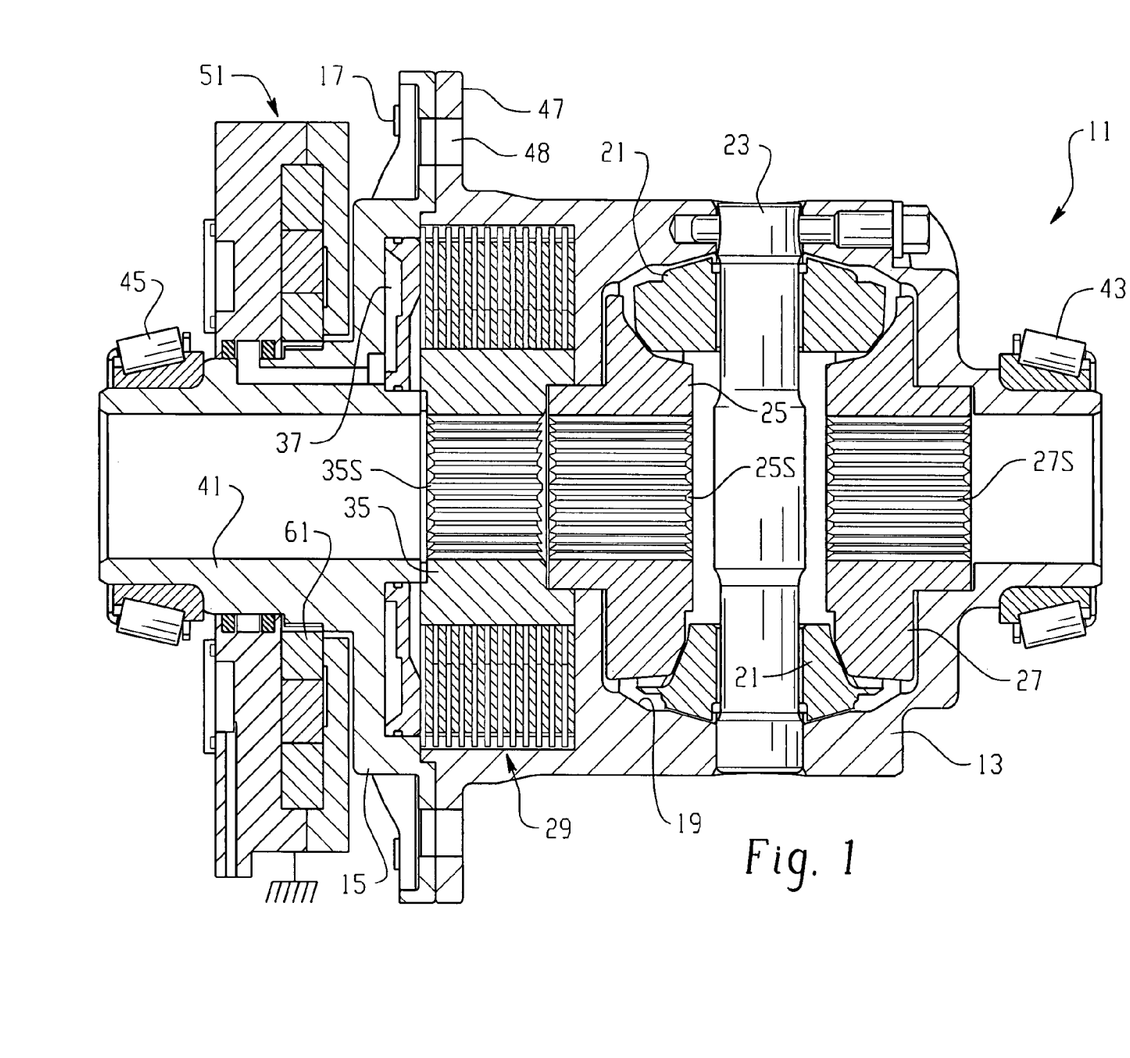
FIG. 1 is an axial cross-section of a vehicle differential coupling device made in accordance with the teachings of the present invention.

Referring now to the drawings, which are not intended to limit the invention, FIG. 1 illustrates a differential coupling device, general designated 11, for use in a vehicle drive line, and which is of the general type illustrated and described in the above-incorporated patents. By way of example only, the differential coupling device 11, as shown in FIG. 1, may typically be utilized as an inter-wheel limited slip differential. The use of the term "limited" should be understood to mean and include coupling devices which can merely reduce the "slip" between the input and output, as well as those which can actually "lock" the output relative to the input, for rotation therewith. The differential coupling device 11 comprises a housing, including a main housing 13 (which could also be referred to as a "gear housing"), and a hub housing 15. The main housing 13 and the hub housing 15 may be held together by any suitable means, well known in the art, such as a plurality of bolts (several of which are partially visible in FIG. 1, bearing the reference numeral "17").

Referring still to FIG. 1, the main housing 13 defines a gear chamber 19, and disposed therein, but by way of example only, there may be provided a typical differential gear set. In the subject embodiment, there is included, as part of the gear set, a pair of input pinion gears 21, rotatably mounted relative to a pinion shaft 23, the pinion gears 21 being in toothed engagement with a pair of side gears 25 and 27. In the subject embodiment, and again by way of example only, the input pinion gears 21 (along with the housings 13 and 15) may be considered the "input" to the coupling device 11, while the side gears 25 and 27 comprise the "outputs" of the coupling device 11. More specifically, for purposes of most of the subsequent description, the side gear 25 will be considered to comprise the "output" of the coupling device 11. As will be understood by those skilled in the art, the ultimate "outputs" of the coupling device 11 would be a pair of axle shafts (not shown herein for simplicity) which would be in splined engagement with the side gears 25 and 27.

The side gears 25 and 27 define sets of straight, internal splines 25S and 27S, respectively, which are adapted to receive the left and right axle shafts mentioned previously, whereby the differential coupling device 11 transmits torque by means of the axle shafts to associated vehicle drive wheels (also not shown), in a manner which is well known and forms no part of the present invention. It should be clearly understood however, that the structure described and illustrated herein is by way of example only, and the present invention may also be used with various other types of coupling device structures.

Figure 2:
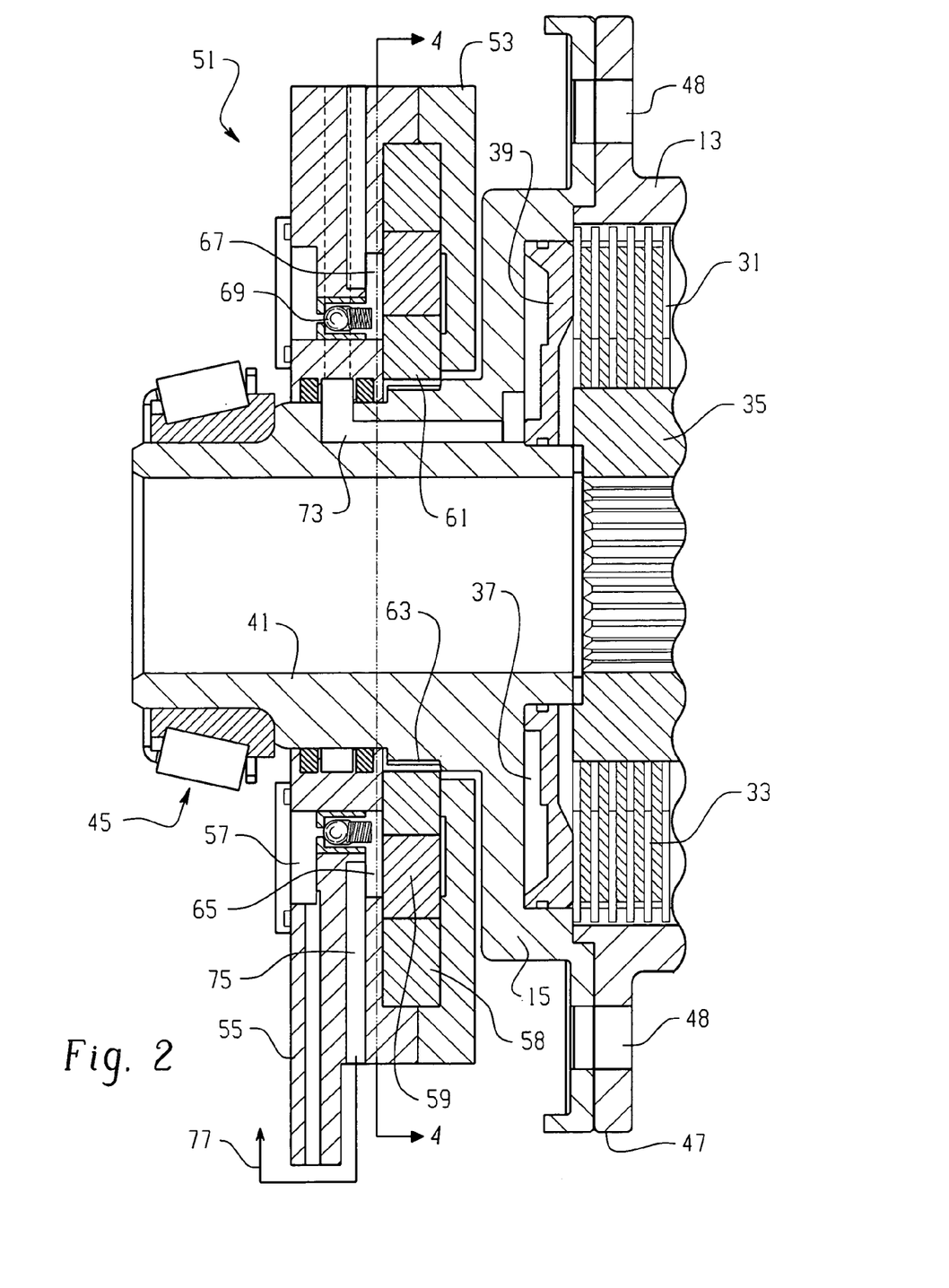
FIG. 2 is an enlarged, fragmentary, axial cross-section, similar to FIG. 1, illustrating in greater detail that portion of the coupling device which is modified from the known, prior device, in accordance with the present invention.

Referring still primarily to FIG. 1, there is disposed within the main housing 13 a clutch pack, generally designated 29, which, as is shown in greater detail (although fragmentarily) in FIG. 2 comprises a plurality of outer disks 31 which are in splined engagement with a set of internal splines defined by the main housing 13, as is now well known. In addition, the clutch pack 29 includes a plurality of inner disks 33, which are interleaved with the outer disks 31 in a well-known manner, the inner disks 33 being in splined engagement with a coupling element 35. The coupling element 35 defines a set of internal splines 35S, which are also adapted to be in splined engagement with the left axle shaft, such that the coupling element 35 is fixed, in the subject embodiment, to rotate with the side gear 25, it being understood that such a spline arrangement, or even the presence of the coupling element 35 itself, is not essential to the present invention.

The hub housing 15 cooperates with an adjacent portion of the main housing 13 to define a clutch apply chamber 37, and disposed within the clutch apply chamber 37, and moveable axially therein, is a clutch piston 39. As is well known to those skilled in the art of such devices, variations in the fluid pressure in the clutch apply chamber 37 will result in variations in the axial force applied by the clutch piston 39 to the clutch pack 29 and therefore, will result in variations in the "bias torque", i.e., the torque transmitted through the clutch pack 29 from the input of the coupling device 11 to the output (either of side gears 25 or 27).

Referring now to FIG. 2, in conjunction with FIG. 1, the hub housing 15 includes a hub portion 41 and typically, the main housing 13 and the hub portion 41 would be rotatably supported within a stationary outer differential housing (not shown herein) by means of a pair of tapered roller bearing sets 43 and 45, respectively, the outer races thereof being omitted from the drawings for simplicity. The direct rotational input to the coupling device 11 would typically be a ring gear (not shown herein) which would typically be mounted to a radially-extending flange portions 47, formed by mating flanges of the main housing 13 and hub housing 15, with the ring gear being attached to the flange portion 47 by any suitable means, such as a plurality of bolts which would pass through openings 48. Thus, all of the structure described up to this point would typically be rotating relative to the outer differential housing, which is stationary relative to the remainder of the vehicle.

Referring still to FIGS. 1 and 2, disposed in a surrounding relationship relative to the hub portion 41 is a plenum assembly, generally designated 51. As may best be seen in FIG. 2, the plenum assembly 51 includes a plenum housing 53 which would typically be fixed (stationary) within the outer differential housing, as is represented schematically in FIG. 1 by means of a "ground" symbol. The plenum housing 53 includes an inlet portion 55 which would extend down into a fluid reservoir contained within the differential housing, in a manner well known to those skilled in the art. Fluid which is drawn from the reservoir up through the inlet portion 55 enters an annular inlet chamber 57.

Figure 4:
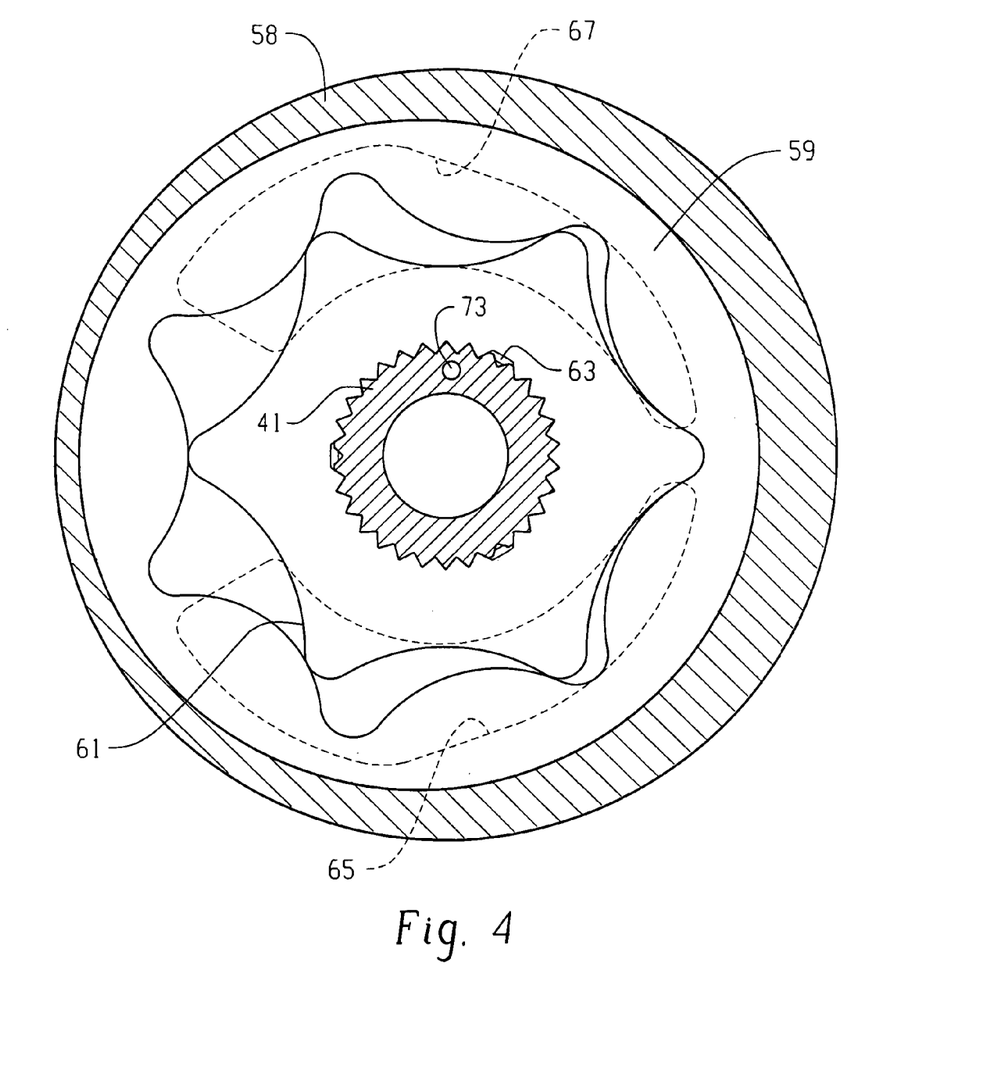
FIG. 4 is a transverse cross-section, taken on line 4-4 of FIG. 2, but on a somewhat smaller scale, and with the plenum housing omitted, illustrating one important aspect of the present invention.

Referring now primarily to FIGS. 2 and 4, there is illustrated one important aspect of the present invention. Disposed within the plenum housing 53 is a gerotor gear set comprising an eccentric housing element 58, an internally-toothed outer rotor 59 and an externally-toothed inner rotor 61. The inner rotor 61 is in splined engagement, at a spline connection 63, with an outer cylindrical surface of the hub portion 41, such that the inner rotor 61 and outer rotor 59 are rotating whenever the differential coupling device 11 is rotating which would typically, but not necessarily, mean that the gerotor pump 58,59,61 is pumping fluid whenever the vehicle is moving. Although the present invention is being illustrated and described in terms of the inner rotor 61 being driven by the hub portion 41, by means of a spline connection 63, it should be apparent that such is not a limitation of the invention, and that, within the scope of the invention, the inner rotor 61 could be driven using various arrangements, such as a key and keyway, or a press-fit relationship, or any other suitable arrangement.

Figure 3:
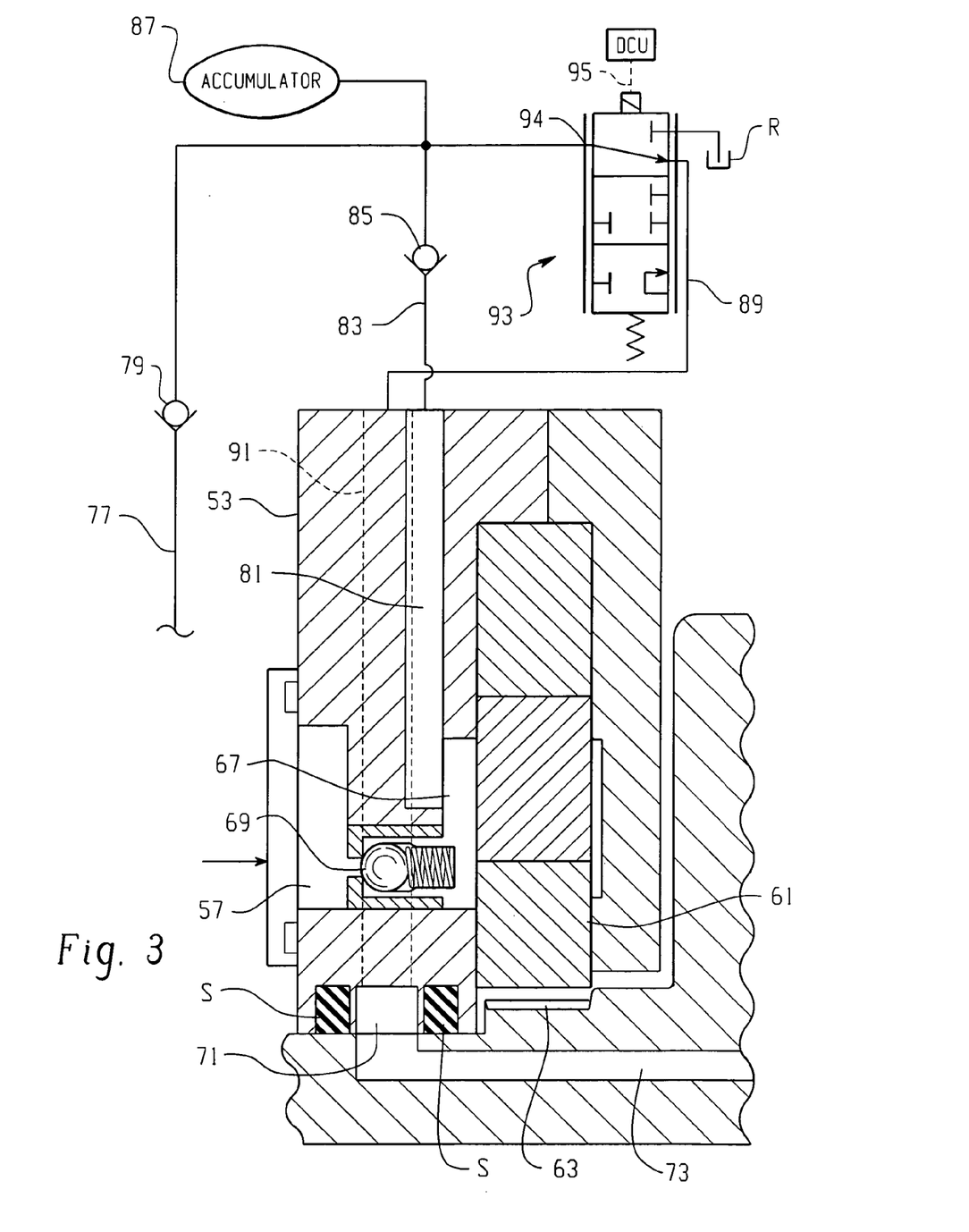
FIG. 3 is a further enlarged, fragmentary, axial cross-section, similar to FIG. 2, but illustrating an embodiment of a control system which may be utilized with the present invention.

Referring now primarily to FIGS. 2 and 3, in conjunction with FIG. 4, it may be seen that the plenum housing 53 (which is omitted in FIG. 4) defines a pair of arcuate, kidney-like fluid chambers 65 and 67, each of which is able to receive inlet fluid (see arrow in FIG. 3) from the annular inlet chamber 57 through an inlet check valve 69, there being one of the check valves 69 associated with each of the fluid chambers 65 and 67. As the input to the differential coupling device 11 rotates, thus rotating the rotors 59 and 61, fluid is drawn from the inlet chamber 57 past whichever of the check valves 69 is associated with the fluid chamber (65 or 67) which is open to the "expanding" volume chambers defined between the rotors 59 and 61, as the term "expanding" in regard to volume chambers is well known in the gerotor art.

The rotors 59 and 61 also define "contracting" volume chambers, as that term is also well known in the gerotor art, and pressurized fluid is communicated from there to its adjacent fluid chamber (65 or 67), and from there is communicated to an internal groove 71 (see FIG. 3) defined by the plenum housing, and surrounding a cylindrical outer surface of the hub portion 41. On either side of the internal groove 71 is a seal member S, it being understood that construction details of the seal members S are beyond the scope of the present invention, but may be better understood from the above-referenced co-pending application U.S. Ser. No. 10/964,134, assigned to the assignee of the present invention and incorporated herein by reference.

The internal groove 71 defined by the plenum housing 53 is in constant open fluid communication with a generally axial fluid passage 73, which opens to the cylindrical outer surface of the hub portion 41. The fluid passage 73 is defined by the hub portion 41 and is in open fluid communication with the clutch apply chamber 37. Thus, for either direction of rotation of the input of the coupling device 11, pressurized fluid is being communicated from the output of the gerotor gear set into the clutch apply chamber 37.

Referring now primarily to FIGS. 2 and 3, it will be assumed for purposes of subsequent discussion that the differential coupling device 11 is rotating in a forward drive direction, and that as a result, the kidney-like fluid chamber 67 comprises the inlet to the gerotor pump while the kidney-like fluid chamber 65 comprises the pressurized outlet of the gerotor pump. In the described mode of operation of the coupling device 11, pressurized fluid is communicated from the fluid chamber 65 through a radial fluid passage 75 (see FIG. 2) defined by the plenum housing 53 to a fluid conduit 77, illustrated herein schematically in FIGS. 2 and 3 as being external to the differential coupling device 11, although such is clearly not an essential feature of the invention, but instead, is shown herein to facilitate an illustration and description of the external control circuitry of FIG. 3.

Referring now primarily to FIG. 3, the fluid conduit 77 includes a check valve 79 so that pressurized fluid cannot flow through the fluid conduit 77 into the kidney-like fluid chamber 65 when the device 11 is operating such that the fluid chamber 65 is the inlet side of the gerotor pump. The plenum housing 53 also defines a radial fluid passage 81 in fluid communication with the kidney-like fluid chamber 67. The fluid passage 81 is in communication with a fluid conduit 83 which includes a check valve 85, for the same purpose just described in regard to the check valve 79.

The fluid conduits 77 and 83 are connected to each other, and in fluid communication with the port (which serves as both "inlet" and "outlet") of an accumulator 87. It should be understood that the presence of the accumulator 87 in the control circuit is not an essential feature of the invention, except to the extent specifically recited hereinafter in one or more of the appended claims, but instead, is included in the control circuit of FIG. 3 primarily to illustrate some of the expanded functional capability of the differential coupling device 11, and the control system therefor, resulting from the incorporation therein of the present invention.

The internal groove 71, defined by the plenum housing 53, communicates both with the clutch apply chamber 37, as was described previously, and with an external fluid conduit 89, by means of a fluid passage 91. The fluid passage 91 is not in the plane of FIG. 3, and therefore, is represented in FIG. 3 by only a dashed line. Therefore, at any point in time when the differential coupling device 11 is operating, regardless of which direction of rotation is occurring, the fluid conduit 89 and the fluid passage 91 contain pressure representative of the pressure in the apply chamber 37.

Referring still primarily to FIG. 3, there is shown a three-position, three-way, solenoid-operated control valve 93 having an inlet 94 in fluid communication with a junction of the fluid conduits 77 and 83, and having one of its outlets in communication with the fluid conduit 89 (and therefor, with the apply chamber 37). The other outlet of the control valve 93 is in communication with a "source" of low pressure fluid, represented herein as a system reservoir R, which, typically, may comprise a sump region within the outer differential housing (not shown herein).

The operation of the differential coupling device 11 will now be described. Whenever the vehicle is moving, and the main housing 13 is rotating, the hub portion 41 is driving the rotors 59 and 61, thereby generating pressurized fluid in the fluid passage 81, which is communicated by means of the fluid conduit 83, past the check valve 85, to the inlet 94 of the control valve 93. In response to an input 95 (a signal from a DCU) to the control valve 93, pressurized fluid is communicated through the valve 93, and then by means of the fluid conduit 89 to the fluid passage 91, and into the internal groove 71. As may be seen in FIG. 3, the control valve 93 is "infinitely variable" between the two extreme positions of the valve, such that the pressure in the internal groove 71 (and also in the clutch apply chamber 37) may be modulated anywhere between pump output pressure (pressure in passage 81) and reservoir pressure (or whatever constitutes "low" pressure).

In accordance with one aspect of the invention, the presence of the accumulator 87 in the control system of FIG. 3 provides the coupling device 11 with the capability of engaging prior to any movement of the vehicle with which the coupling device 11 is associated. In view of the presence of the check valves 79 and 85, and the ability to block flow from the inlet 94 when the control valve 93 is spring biased in the absence of a signal 95, pressurized fluid is retained within the accumulator 87. Then, subsequently, even with the absence of rotation of the input (the housing 13), the control valve 93 may be actuated to communicate some of the stored fluid pressure from the accumulator 87 to the internal groove 71, as described previously. In this manner, the coupling device 11 may be engaged, and thereafter able to transmit torque, even while the vehicle is at a standstill.

Figure 5:
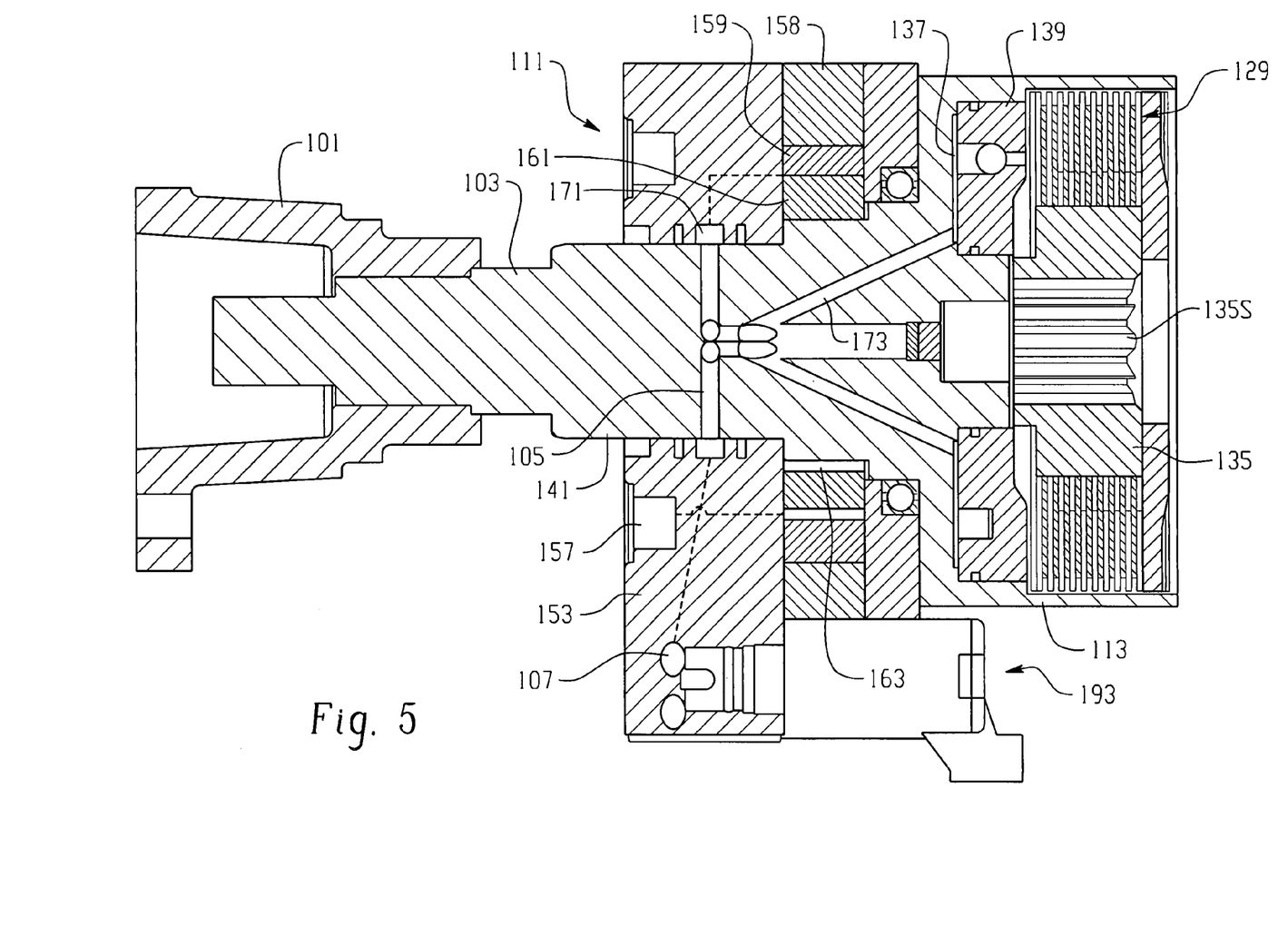
FIG. 5 is an axial cross-section of an alternative embodiment of the present invention, which may be utilized as an inter-axle coupling device.

As was noted previously, the embodiment of the present invention shown in FIGS. 1 through 4 would typically be utilized as an inter-wheel differential coupling device, but referring now primarily to FIG. 5, there is illustrated an alternative embodiment of the invention which is structurally somewhat different than the coupling device 11 of FIGS. 1 through 4, but which operates on the same general principals, utilizing the same inventive concept. In the alternative embodiment shown in FIG. 5, the elements bear reference numerals in excess of "100", and those elements in the alternative embodiment of FIG. 5 which correspond to elements of the first embodiment will bear the same reference numeral, plus "100".

Therefore, in FIG. 5, there is shown a differential coupling device generally designated 111 including an input joint member 101 in splined engagement with an input shaft 103. The input shaft 103 includes an enlarged hub portion 141, and a further enlarged main housing 113. Disposed within the main housing 113 is a clutch pack, generally designated 129, which will not be described in greater detail herein. The clutch pack 129 is operable to transmit drive torque from the input (the input shaft 103 and main housing 113) to an output coupling element 135 which defines a set of internal splines 135S, disposed for splined engagement with an output shaft (not shown herein). The output shaft would typically provide the input drive to a device such as the rear drive axle.

Adjacent the clutch pack 129, the main housing 113 defines a piston chamber within which is disposed a clutch piston 139 which cooperates with the housing 113 to define a clutch apply chamber 137. In the same manner as for the first embodiment, pressurized fluid in the clutch apply chamber 137 would result in engagement of the clutch pack 129, such that the pressure level in the chamber 137 would determine the bias torque of the coupling device 111. Surrounding the hub portion 141, in the same manner as in the first embodiment, there is a plenum housing 153 which defines an annular inlet chamber 157, from which fluid is drawn into the expanding volume chambers of a gerotor gear pump, disposed within an eccentric housing member 158. The expanding volume chambers are defined between an internally toothed rotor 159 and an externally toothed rotor 161. In the same manner as in the first embodiment, the externally toothed inner rotor 161 is in driven engagement with the input shaft 103 by means of a spline connection 163.

The plenum housing 153 defines an annular internal groove 171 which is in communication, by means of a radial passage 105 and an axial passage 173, with the clutch apply chamber 137. The internal groove 171 is also in communication with an inlet 107 of a solenoid-operated, pressure control valve 193 whereby, whenever the differential coupling device 111 is being driven, the gerotor pump is capable of generating pressurized fluid in the apply chamber 137, and the actual pressure in the chamber 137 (and therefore the extent of engagement, or torque bias, in the clutch pack 129) is proportional to an input signal communicated to the pressure control valve 193, it being understood that as the input signal to the pressure control valve 193 decreases, the inlet 107 is open to a source of low pressure fluid, such as the system reservoir R shown in FIG. 3.

Although only one of the pressure control valves 193 is shown in FIG. 5, those skilled in the art will understand that, in order to cause the coupling device 111 to respond as quickly as desired, there may be two or more of the valves 193, each in the same position relative to the inlet 107 as is shown in FIG. 5. It should be noted that the differential coupling device 111 of the second embodiment could be utilized in conjunction with the control circuitry and system shown in FIG. 3, but for ease of illustration, such has been omitted from the embodiment of FIG. 5. Therefore, in the second embodiment, there could be included an accumulator, as part of the control circuit, such that pressure energy could be stored as described previously, and the second embodiment could also be engaged even before vehicle movement occurs.

Those skilled in the art of gerotor pumps will understand that, in operating either embodiment of the invention, it may be necessary to provide suitable means (such as check valving, etc.) to prevent cavitation on the inlet side of the gerotor pump, and it is believed to be well within the ability of those skilled in the art to select appropriate "anti-cavitation" means and fine-tune such means for each version of the present invention.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A coupling device including a rotatable housing defining a clutch cavity; a clutch assembly disposed in said clutch cavity and including a first clutch member fixed to rotate with said housing, and a second clutch member fixed to rotate with an output; said housing defining an apply chamber, and a clutch apply member disposed in said apply chamber and being operable to bias said first and second clutch members into torque transmitting relationship in response to the presence of pressurized fluid in said apply chamber; said coupling device including a source of said pressurized fluid, and control valve means operable to vary the fluid pressure in said apply chamber in response to variations in an input; and a stationary plenum assembly operably associated with said rotatable housing and cooperating therewith to define a high pressure fluid passage disposed between said source of said pressurized fluid and said apply chamber; characterized by:
   (a) said source of pressurized fluid comprising a pumping element includin rotor operable to pump pressurized fluid in response to rotation of said rotor;
   (b) said stationary plenum assembly defining a pumping chamber, and said pumping element being operably disposed within said pumping chamber to pump pressurized fluid into said high pressure fluid passage; and
   (c) drive means operable to transmit rotational movement of said rotatable housing to said rotor of said pumping element.

2. A coupling device as claimed in claim 1, characterized by said rotatable housing including a hub portion defining an outer cylindrical surface, and said stationary plenum assembly being disposed in a surrounding relationship about said outer cylindrical surface of said hub portion.

3. A coupling device as claimed in claim 2, characterized by said rotor of said pumping element being disposed in surrounding relationship about said outer cylindrical surface of said hub portion, said drive means comprising said rotor defining internal teeth and said outer cylindrical surface defining mating teeth.

4. A coupling device as claimed in claim 2, characterized by said high pressure fluid passage including an opening defined by said outer cylindrical surface of said hub portion, said high pressure fluid passage extending from said opening, generally axially, to said apply chamber.

5. A coupling device as claimed in claim 1, characterized by said pumping element comprising a gerotor gear set including an internally-toothed outer rotor and in toothed engagement therewith, an externally-toothed inner rotor comprising said rotor driven by said drive means.

6. A control system for a coupling device including a rotatable housing defining a clutch cavity; a clutch assembly disposed in said clutch cavity and including a first clutch member fixed to rotate with said housing, and a second clutch member fixed to rotate with an output; said housing defining an apply chamber, and a clutch apply member disposed in said apply chamber and being operable to bias said first and second clutch members into torque transmitting relationship in response to the presence of pressurized fluid in said apply chamber; said coupling device including a source of said pressurized fluid, said source being operably associated with said rotatable housing and driven thereby, and control valve means operable to vary the fluid pressure in said apply chamber in response to variations in an input; and a stationary plenum assembly operably associated with said rotatable housing and cooperating therewith to define a high pressure fluid passage disposed between said source of said pressurized fluid and said apply chamber; said control system being characterized by:
   (a) said source of pressurized fluid cooperating with said plenum assembly to define a fluid outlet in fluid communication with an inlet of said control valve means;
   (b) said control system further comprising an accumulator having its port in fluid communication with said fluid outlet and with said inlet of said control valve means, whereby said control valve means is operable to communicate pressurized fluid from said accumulator to said apply chamber, in response to said input, in the absence of rotation of said rotatable housing.

7. A coupling device, comprising:
   a rotatable housing defining a clutch cavity, an apply chamber, and a clutch apply member disposed in said apply chamber;
   a clutch assembly disposed in said clutch cavity and including a first clutch member fixed to rotate with said housing and a second clutch member fixed to rotate with an output; said clutch apply member being operable to bias said first and second clutch members into torque transmitting relationship in response to the presence of pressurized fluid in said apply chamber;
   a pumping element including a rotor operable to pump pressurized fluid in response to rotation of said rotor, said rotor operably connected for rotation with said housing;
   a control valve operable to vary the fluid pressure in said apply chamber in response to variations in an input; and
   a stationary plenum assembly operably associated with said rotatable housing and cooperating therewith to define a high pressure fluid passage disposed between said source of said pressurized fluid and said apply chamber, said stationary plenum assembly defining a pumping chamber, and said pumping element being operably disposed within said pumping chamber to pump pressurized fluid into said high pressure fluid passage.

8. A coupling device, comprising:
   a rotatable housing defining a clutch cavity, an apply chamber, and a clutch apply member disposed in said apply chamber;
   a clutch assembly disposed in said clutch cavity and including a first clutch member fixed to rotate with said housing and a second clutch member fixed to rotate with an output; said clutch apply member being operable to bias said first and second clutch members into torque transmitting relationship in response to the presence of pressurized fluid in said apply chamber;
   pressurized fluid comprising a pumping element including a rotor operable to pump pressurized fluid in response to rotation of said rotor, said rotor operably connected for rotation with said housing;
   a control valve operable to vary the fluid pressure in said apply chamber in response to variations in an input;

a stationary plenum assembly operably associated with said rotatable housing and cooperating therewith to define a high pressure fluid passage disposed between said source of said pressurized fluid and said apply chamber, said stationary plenum assembly defining a pumping chamber, and said pumping element being operably disposed within said pumping chamber to pump pressurized fluid into said high pressure fluid passage; and an accumulator having its port in fluid communication with a fluid outlet defined by said source of pressurized fluid and said plenum assembly and with an inlet of said control valve, whereby said control valve is operable to selectively communicate pressurized fluid from said accumulator to said apply chamber, in response to said input, in the absence of rotation of said rotatable housing.

9. A coupling device, comprising:

a rotatable housing defining a clutch cavity, an apply chamber, and a clutch apply member disposed in said apply chamber;

a clutch assembly disposed in said clutch cavity and including a first clutch member fixed to rotate with said housing and a second clutch member fixed to rotate with an output; said clutch apply member being operable to bias said first and second clutch members into torque transmitting relationship in response to the presence of pressurized fluid in said apply chamber;

a source of pressurized fluid comprising a pumping element including a rotor operable to pump pressurized fluid in response to rotation of said rotor, said rotor operably connected for rotation with said housing;

a control valve operable to vary the fluid pressure in said apply chamber in response to variations in an input;

a stationary plenum assembly operably associated with said rotatable housing and cooperating therewith to define a high pressure fluid passage disposed between said source of said pressurized fluid and said apply chamber; and an accumulator having its port in fluid communication with a fluid outlet defined by said source of pressurized fluid and said plenum assembly and with an inlet of said control valve, said accumulator having pressurized fluid stored therein that is selectively communicated to said apply chamber by said control valve in response to said input in the absence of rotation of said rotatable housing.

* * * * *